Patented Sept. 20, 1932

1,878,047

UNITED STATES PATENT OFFICE

FREDERICK R. WENGER, OF LOS ANGELES, CALIFORNIA

METHOD OF MAKING A CELLULAR COMPOSITION

No Drawing.   Application filed March 23, 1929. Serial No. 349,524.

This invention has to do with a method of making a composition, it being an object of the invention to provide an economical and commercially practical method of making a cellular composition having various practical uses.

It is a general object of the present invention to provide a simple practical method for making a product formed of pulp, for instance, pulp such as is commonly used in the manufacture of paper, and the like, suitable for use as sound and heat insulation, packing, and for numerous other purposes.

It is an object of the present invention to provide a method of producing an inexpensive, commercially practical cellular composition which is sufficiently soft to prevent injury to fragile objects packed or placed in it and yet sufficiently strong and durable to remain in shape and condition to hold such objects with reasonable firmness. The product or composition provided by this invention is particularly useful as a packing material to be used in the transportation of fragile objects where it is desired to pack or support the objects within containers or packing cases in a manner so that they are protected from shock and against movement.

Another object of the invention is to provide a cellular composition which is suitable for use in sheets or bodies as insulating material to insulate against heat or sound.

It is another object of the invention to provide a practical and economical method of manufacturing pulp into a cellular mass.

A further object of the invention is to provide a method of manufacture such as I have referred to whereby the mass can be formed into any desired shape, depending upon the conditions or purpose for which it is to be used.

The various objects and features of the invention will be best and more fully understood from the following detailed description of a typical manner of carrying out the invention, throughout which description reference will be confined to but a single form of the invention, it being understood that various modifications may be made without departing from the spirit of the invention.

It is believed that the nature of characteristics of the product of this invention will be best understood from a description of the method of manufacture, and therefore I will proceed with a typical manner of carrying out the method provided by the invention.

The composition is made from pulp, say, for instance, a pulp such as is ordinarily used in the manufacture of paper. In practice the composition can be advantageously formed of pulp prepared from waste paper such as scrap paper, newsprint, etc. or from wood pulp such as is ordinarily used in the manufacture of cheap paper. Where I use the term "pulp" I prefer to and mean to include various compositions or materials of the general character I have mentioned.

The pulp may be prepared in any suitable manner, that is, the materials used, whether wood pulp, waste paper, or other suitable materials, are mixed with water and are formed into a wet, pliable, or pulpy mass, such as is ordinarily prepared preliminary to the manufacture of paper. The pulp is preferably used at a consistency which allows it to be readily stirred or agitated. The water content is regulated to gain such consistency.

In accordance with the invention, the pulpy mass is brought into contact with carbon dioxide gas so that the gas is distributed throughout the mass. This is obtained by agitating or stirring the mass as carbon dioxide gas is introduced into or through it, or while the mass is held in an atmosphere of carbon dioxide gas, preferably under pressure. In manufacture, suitable apparatus may be used to hold the mass of pulp and to introduce the carbon dioxide gas into the mass. The introduction of the carbon dioxide gas into the mass of pulp is preferably carried out at normal temperature, say, between 34 to 70 degrees Fahrenheit. The exact temperature at which the gas is introduced has considerable to do with the cellular structure of the finished product as a greater quantity of gas is absorbed or held in the mass of pulp if the introduction is made at a low temperature, and the greater amount of gas results in a more cellular or loose finished product.

The carbon dioxide gas and the water content of the mass combine to form carbonic acid throughout the mass of pulp. Further, the agitation or beating of the pulp, as the gas is introduced, causes a substantial amount of gas to become imprisoned throughout the mass of pulp in the form of small bodies or globules mechanically held. The pulpy mass containing the carbon dioxide gas combined and/or mechanically held, is next heated to cause expansion of the gas held mechanically and disassociates or liberates the gas chemically held. This occurs throughout the mass. I preferably apply a slow or moderate heat, say, for instance, about 85 to 180 degrees Fahrenheit, for a period of one-half to one hour. The heat thus applied causes an infinite number of voids or cavities to form throughout the mass which cavities enlarge so that the mass swells until it is many times its original volume or bulk. As the mass dries, it remains in this expanded or enlarged state and is in condition ready for use. The dry product is more or less spongy in character yet it has considerable strength and rigidity. It will be obvious that the expansion may be caused to take place in moulds or forms which cause the finished product to take any desired shape and it will be apparent that the product when completed may be cut or otherwise worked into sheets or into any desired form or shape. For purpose of example, if the material is to be used for packing eggs in crates or boxes, it may be moulded in bodies having suitable openings or depressions designed to receive the eggs, while if it is to be used as insulation it may be formed in sheets or blocks of suitable sizes and proportions. It will also be obvious that suitable reinforcing material may be incorporated in or throughout the mass as it is formed by placing such material in the forms or containers in which the mass is expanded.

Having described only a typical manner of carrying out the invention, I do not wish to limit myself to the specific details set forth, but wish to reserve to myself any changes or variations that may appear to those skilled in the art or fall within the scope of the following claims:

Having described my invention, I claim:

1. The process of treating pulp including introducing carbon dioxide gas into a mass of wet pulp and then drying the mass.

2. The process of treating pulp including introducing carbon dioxide gas into a mass of wet pulp and then drying the mass slowly.

3. The process of treating pulp including introducing carbon dioxide gas into a mass of wet pulp at normal temperature and then drying the mass.

4. The process of treating pulp including introducing carbon dioxide gas into a mass of pulp wet with water, and then drying the mass.

5. The process of treating pulp including introducing carbon dioxide gas into a mass of wet pulp and then drying the mass at a moderate heat.

6. The process of treating pulp including, wetting the pulp with water, introducing carbon dioxide gas throughout the mass at normal temperatures, and then drying the mass at a moderate temperature.

7. The process of treating pulp including introducing carbon dioxide gas into a mass of wet pulp by agitating the pulp in the presence of the gas, and then drying the mass.

8. The process of treating pulp to form a cellular body including, introducing carbon dioxide gas into a mass of wet pulp, drying the mass at a moderate temperature, and shaping the mass while drying.

In witness that I claim the foregoing I have hereunto subscribed my name this 25th day of February, 1929.

FREDERICK R. WENGER.